United States Patent

Satoh et al.

[11] Patent Number: 6,078,119
[45] Date of Patent: Jun. 20, 2000

[54] BEARINGLESS ROTARY MACHINE

[75] Inventors: Tadashi Satoh; Masaru Ohsawa; Satoshi Mori, all of Fujisawa, Japan

[73] Assignee: Ebara Corporation, Tokyo, Japan

[21] Appl. No.: 09/199,338

[22] Filed: Nov. 25, 1998

[30] Foreign Application Priority Data

| Nov. 26, 1997 | [JP] | Japan | 9-340699 |
| Dec. 25, 1997 | [JP] | Japan | 9-367111 |
| Mar. 26, 1998 | [JP] | Japan | 10-096972 |
| Mar. 26, 1998 | [JP] | Japan | 10-096973 |
| May 26, 1998 | [JP] | Japan | 10-161325 |

[51] Int. Cl.$^7$ .......................... H02K 17/16; F16C 32/04
[52] U.S. Cl. ...................... 310/90.5; 310/179; 310/68 C; 318/798
[58] Field of Search ................................ 310/184, 162, 310/166, 179, 90.5, 68 C; 318/803, 811, 805, 808, 798

[56] References Cited

U.S. PATENT DOCUMENTS

| 4,724,373 | 2/1988 | Lipo | 318/805 |
| 4,841,204 | 6/1989 | Studer | 318/254 |
| 5,294,876 | 3/1994 | Joensson | 318/803 |
| 5,488,280 | 1/1996 | Langreck | 318/805 |
| 5,708,346 | 1/1998 | Schöb | 318/803 |
| 5,770,199 | 6/1998 | Eibl et al. | 424/176.1 |
| 5,880,550 | 3/1999 | Fukao et al. | 310/179 |
| 5,936,370 | 8/1999 | Fukao et al. | 318/652 |

FOREIGN PATENT DOCUMENTS

| 2-193547 | 7/1990 | Japan . |
| 7-264797 | 10/1995 | Japan . |
| 7-264798 | 10/1995 | Japan . |
| 8-84455 | 3/1996 | Japan . |
| 8-84491 | 3/1996 | Japan . |
| 8-223857 | 8/1996 | Japan . |
| 8-275444 | 10/1996 | Japan . |
| 8-275595 | 10/1996 | Japan . |

OTHER PUBLICATIONS

Satoshi Mori et al. "Experiments on a Bearingless Synchronous Reluctance Motor with Load" 5th Int'l. Symposium on Magnetic Bearings, Kanazawa, Japan—Aug. 96.

*Primary Examiner*—Nestor Ramirez
*Assistant Examiner*—Burt Mullins
*Attorney, Agent, or Firm*—Armstrong, Westerman, Hattori, McLeland & Naughton

[57] ABSTRACT

An object of the present invention is to provide a bearingless rotary machine which is capable of stably controlling the levitated position of a rotor of an induction motor even if the rotor comprises a squirrel-cage type rotor that is simple in structure and can easily be manufactured.

A bearingless rotary machine has a rotor having secondary current paths and a stator spaced from the rotor by a gap. The stator has two kinds of windings for imparting a rotating and a levitating and supporting force to the rotor. The rotary machine has a magnetic field command calculator, magnetic flux distribution detecting means and correcting means for adjusting the detected control magnetic flux distribution to coincide with the magnetic field distribution command.

14 Claims, 11 Drawing Sheets

BEARINGLESS ROTARY MACHINE

BACKGROUND OF THE INVENTION

1. Field of the Invention

The present invention relates to a bearingless rotary machine capable of serving as an electric motor for rotating a rotatable body and a magnetic bearing for magnetically levitating and supporting the rotatable body, and more particularly to a bearingless rotary machine which can stably control the levitation of a rotor even when the rotor comprises an induction-type rotor having secondary conductors as current paths.

2. Description of the Related Art

There have been proposed various bearingless rotary machines having a cylindrical stator, a cylindrical rotor disposed in the cylindrical stator, and an exciting winding circuits connected to the stator for generating two rotating magnetic fields with different numbers of poles to impart a rotating force to the rotor and apply a positional control force for levitating and supporting the rotor in a given radial position.

The stator has windings for rotating the rotor and windings for positionally controlling the rotor. These windings are supplied with a three-phase alternating current or a two-phase alternating current to generate rotating magnetic fields with different numbers of poles in a certain relationship within the gap between the stator and the rotor for thereby locally distributing a radial magnetic attractive force to the cylindrical rotor.

When currents are supplied to the stator windings, they produce a rotating magnetic field having M poles and a rotating magnetic field having N poles. The rotating magnetic field having M poles will hereinafter be referred to as a "drive magnetic field", and the rotating magnetic field having N poles as a "positional control magnetic field". The drive magnetic field applies a rotating drive force to the rotor, and the positional control magnetic field is added to the drive magnetic field to locally distribute the radial force to the rotor for freely adjusting the radially levitated position of the rotor as with magnetic bearings. The M poles and the N poles are related to each other as follows:

$$N=M\pm2$$

for thereby locally distributing the radial magnetic attractive force to the cylindrical rotor.

In this manner, the bearingless rotary machine operates as an electric motor which magnetically attracts the rotor to impart a rotating force to the rotor and also as a magnetic bearing for controlling the radially levitated position of the rotor to levitate the rotor out of contact with the stator. The above bearingless rotary machine dispenses with an electromagnetic yoke and a winding which make up a magnetic bearing which has heretofore been required to support the rotatable shaft of an electric motor, and hence has a reduced shaft length and has its high-speed rotation less limited by shaft vibrations. The bearingless rotary machine is also small in size and weight. The current flowing through the positional control winding and the current flowing through the drive windings develop respective flux distributions that develop a synergistic action equivalent to a magnetic bearing, which can produce a large control force with a much smaller current than would be required by a conventional magnetic bearing, resulting in a large energy-saving arrangement.

One type of rotor is an induction-type rotor in which a rotating magnetic field generated by a stator causes induced currents to flow in secondary conductors of the rotor to impart a rotating drive force to the rotor. While there are various induction-type rotors, a typical induction-type rotor is a squirrel-cage type rotor. The squirrel-cage type rotor has a number of metal conductor bars (secondary conductors) of low resistance disposed as current paths parallel to a rotatable shaft in a circular pattern concentric with the rotatable shaft, and metal conductor rings (end rings) interconnecting the opposite ends of the metal conductor rods. When the current paths (secondary conductors) cross a rotating magnetic flux generated by the stator windings, the secondary conductors of the rotor develop induced voltages to produce induced currents. The magnetic flux generated by the stator windings across the secondary conductors and the induced currents flowing through the metal conductor rods of the rotor act with each other to produce a Lorentz force, applying a rotating drive force to the induction-type rotor.

In the bearingless rotary machine, the drive magnetic field and the positional control magnetic field are generated in a mixed fashion by the stator winding currents (primary currents). Therefore, if an ordinary induction-type rotor (squirrel-cage type rotor) is employed, then currents induced by the drive magnetic field and the positional control magnetic field flow through the rotor current paths (secondary conductors). Since the rotating magnetic field having M poles impart a rotating force to the rotor, the bearingless rotary machine will not operate as an induction motor unless an induced current flows. When induced currents developed by the positional control magnetic field having N poles flow in the rotor current paths, a magnetic field is generated as a disturbance by the rotor currents in addition to the magnetic field generated by the stator windings. Consequently, the positional control magnetic field is not determined by only the magnetic field developed by the winding currents, so that the rotor cannot stably be levitated.

SUMMARY OF THE INVENTION

It is therefore an object of the present invention to provide a bearingless rotary machine which is capable of stably controlling the levitated position of a rotor of an induction motor even if the rotor comprises a squirrel-cage type rotor that is simple in structure and can easily be manufactured.

Another object of the present invention is to provide a bearingless rotary machine which is capable of stably controlling the levitated position of a rotor even in a low-frequency range where it is difficult to control, while detecting a flux distribution in a gap between the stator and the rotor with windings arranged in the stator by detecting an induced flux variation across the windings.

According to the present invention, there is provided a bearingless rotary machine comprising a rotor having secondary current paths; a stator spaced from the rotor by a gap, the stator having two kinds of windings for imparting a rotating force to the rotor with a rotating M pole drive magnetic field and a levitating and supporting force to the rotor with a rotating N pole control magnetic field added in synchronism with the rotating M pole drive magnetic field, where N=M±2; displacement detecting censers for detecting a displacement of the rotor; magnetic flux distribution detecting means for detecting an N pole magnetic flux distribution which is generated in the gap between the stator and the rotor; and correcting means for adjusting the detected control magnetic flux distribution to coincide with N pole magnetic field distribution command.

With the above arrangement, an actual magnetic flux distribution generated in the gap between the rotor and the stator is detected, and the detected magnetic flux distribution is adjusted to coincide with a magnetic flux distribution command by correcting means. Since a magnetic flux distribution for exactly levitating and supporting the rotor can be generated regardless of characteristics of the rotor, namely existence of secondary current of the rotor current paths, the rotor can be rotated and the levitated position of the rotor can stably be controlled at the target position.

An actual magnetic flux distribution generated in the gap between the rotor and the stator may be detected by integrating a counter-electromotive voltage induced across a winding on the stator. By integrating the counter electromotive voltage induced across the winding on the stator, an actual magnetic flux distribution generated in the gap between the rotor and the stator can be detected without any special means for the detection of such a magnetic flux distribution.

A process of detecting a magnetic flux by integrating a counter-electromotive voltage induced across a winding on the stator (a search coil or a stator winding itself) is problematic in that a low-frequency component is detected at an attenuated level. To solve this problem, it is preferable to employ a current flowing through a winding which generates a primary magnetic flux, as a corrective quantity for a magnetic flux that is detected at an attenuated level.

When a low-frequency current for generating a magnetic field on the stator is supplied to the stator winding, a magnetic flux corresponding to the current is generated, substituting for a magnetic flux distribution which is largely attenuated in a low-frequency range lower than a cutoff frequency fc. Accordingly, the rotor can stably be magnetically levitated and supported in the low-frequency range lower than the cutoff frequency fc.

A control circuit of the bearingless rotary machine may have a calculator for realizing a voltage function represented by:

$$G(s)=(s+2 \pi fc)/(s+2 \pi fc')$$

where fc is a lower limit frequency for detecting a magnetic flux distribution before being corrected and fc' is a lower limit frequency for detecting a magnetic flux distribution after being corrected, and the voltage function is supplied with an analog integrated value of the counter-electromotive voltage and outputs a corrected integrated value in order to correct frequency characteristics of the analog integrated value so as to be able to detect the magnetic flux distribution in a low-frequency range. With this arrangement, the rotor can also stably be magnetically levitated and supported in the low-frequency range lower than the cutoff frequency fc.

The control circuit may generate an M pole drive magnetic field having a frequency higher than a minimum frequency detectable by a detecting winding on the stator, regardless of a rotational speed of the rotor and a generated drive force for the rotor. Thus, a magnetic flux distribution detectable by the detecting winding is generated in the yap between the stator and the rotor, irrespective of the rotational speed of the rotor, and the detecting winding can detect the magnetic flux distribution. Because there can be generated a magnetic flux distribution capable of stably levitating and supporting the rotor, which may be a simple and rugged rotor such as a squirrel-cage type rotor, even in a low-frequency range, the rotor can be rotated and stably be controlled in its levitated position.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
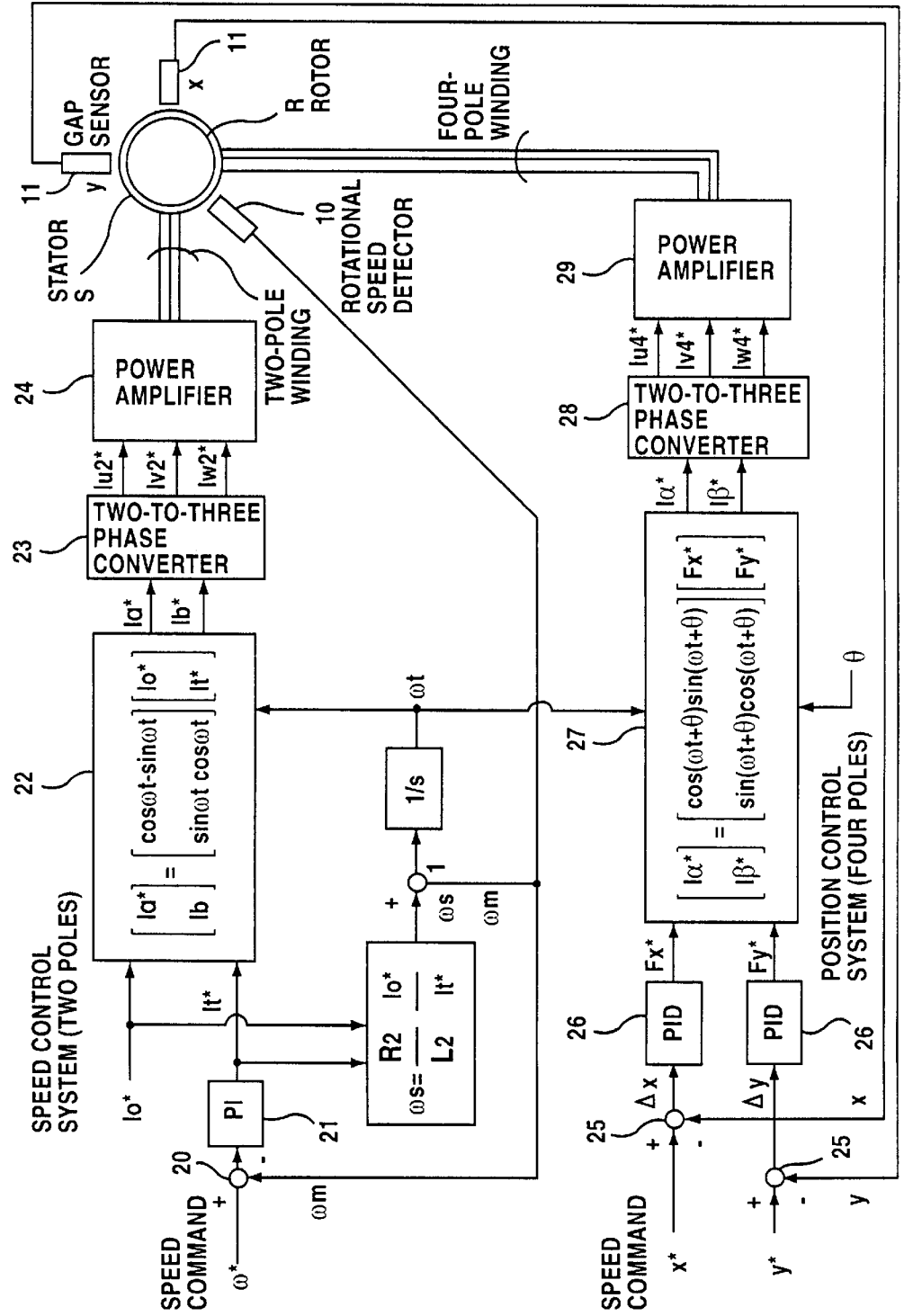
FIG. 1 is a block diagram of a general arrangement of a control system of a bearingless rotary machine.

Like or corresponding parts are denoted by like or corresponding reference characters throughout views.

FIG. 1 shows in block form a general arrangement of a control system of a bearingless rotary machine, on which various embodiments of the present invention are based.

As shown in FIG. 1, a rotor R is rotated by a rotating drive magnetic field having two (m) poles which is generated by two-pole drive winding mounted on a stator S, and the rotor R is controlled in levitated position by a rotating positional control magnetic field having four (n) poles which is generated by four-pole positional control windings mounted on the stator S. Around the rotor R, there are disposed a rotational speed detector 10 for detecting the rotational speed of the rotor R and a pair of gap sensors 11x, 11y for detecting a levitated position of the rotor R in an x direction and a levitated position of the rotor R in a y direction.

The control system includes a speed control system for controlling the rotating magnetic field with the two poles and a positional control system for controlling the rotating magnetic field with the four poles.

The speed control system is supplied with a speed command $\omega^*$, which is compared by a comparator 20 with an actual rotational speed $\omega m$ that is detected by the rotational speed detector 10. The difference between the speed command $\omega^*$ and the detected speed $\omega m$ is applied to a PI(D) (proportional plus integral (plus derivative)) controller 21, which outputs a torque-related current command It* in order to eliminate the difference. An exciting current command Io* corresponding to an exciting current is supplied to a revolving-to-fixed coordinate converter 22, which is also supplied with the torque-related current command It*. The revolving-to-fixed coordinate converter 22 calculates, from the supplied current commands It*, Io* in a revolving coordinate system, two-phase current commands Ia*, Ib* in a fixed coordinate system with respect to a rotating angle $\omega t$ according to the matrix calculation shown in FIG. 1, and outputs the calculated two-phase current commands Ia*, Ib*.

The two-phase current commands Ia*, Ib* in the fixed coordinate system are then converted to three-phase current commands Iu2*, Iv2*, Iw2* by a two-to-three phase converter 23. The three-phase current commands Iu2*, Iv2*, Iw2* are then amplified to predetermined values by a power amplifier 24, and the amplified currents are supplied to the two-pole drive windings mounted on the stator S. The two-pole drive windings mounted on the stator S generate a rotating magnetic field with two poles which rotates the rotor R according to the speed command $\omega^*$.

The positional control system is supplied with predetermined levitated position commands X*, y*, which are compared by a comparator 25 with actual levitated positions x, y of the rotor R detected by the respective gap sensors 11x, 11y. The comparator 25 supplies differences $\Delta x$, $\Delta y$ between the levitated position commands x*, y* and the actual levitated positions x, y to respective PI(D) controllers 26, which calculate respective positional control force commands Fx*, Fy* in order to eliminate the differences $\Delta x$, $\Delta y$. A controller 27 calculates, from the positional control force commands Fx*, Fy* in the revolving coordinate system, two-phase control current commands I$\alpha$*, I$\beta$* in the fixed coordinate system with respect to the rotating angle $\omega t$ according to the matrix calculation shown in FIG. 1, and outputs the calculated two-phase control current commands I$\alpha$*, I$\beta$*.

The two-phase control current commands I$\alpha$*, I$\beta$* are then converted to three-phase current commands Iu4*, Iv4*, Iw4* by a two-to-three phase converter 28. The three-phase current commands Iu4*, Iv4*, Iw4* are then amplified to predetermined values by a power amplifier 29, and the amplified currents are supplied to the four-pole positional control windings mounted on the stator S. The four-pole positional control windings mounted on the stator S generate a rotating positional control magnetic field with four poles in a gap between the stator S and the rotor R. The rotating positional control magnetic field is added to the rotating drive magnetic field for controlling the levitated position of the rotor R.

The two-phase control current commands I$\alpha$*, I$\beta$* calculated by the controller 27 is determined without taking into account induced currents (secondary currents) flowing through current paths of the rotor R. When induced currents flow through the rotor R which comprises a squirrel-cage type rotor, an actual magnetic flux distribution in the gap between the stator S and the rotor R differs from a magnetic flux distribution due to the two-phase control current commands I$\alpha$*, I$\beta$* based on the levitated positions detected by the gap sensors 11x and 11y. Because of the induced currents flowing through the current paths of the rotor R, the magnetic flux distribution for controlling the levitated position of the rotor R, is distorted, failing to exert a normal levitated position control force to the rotor R.

Figure 2:
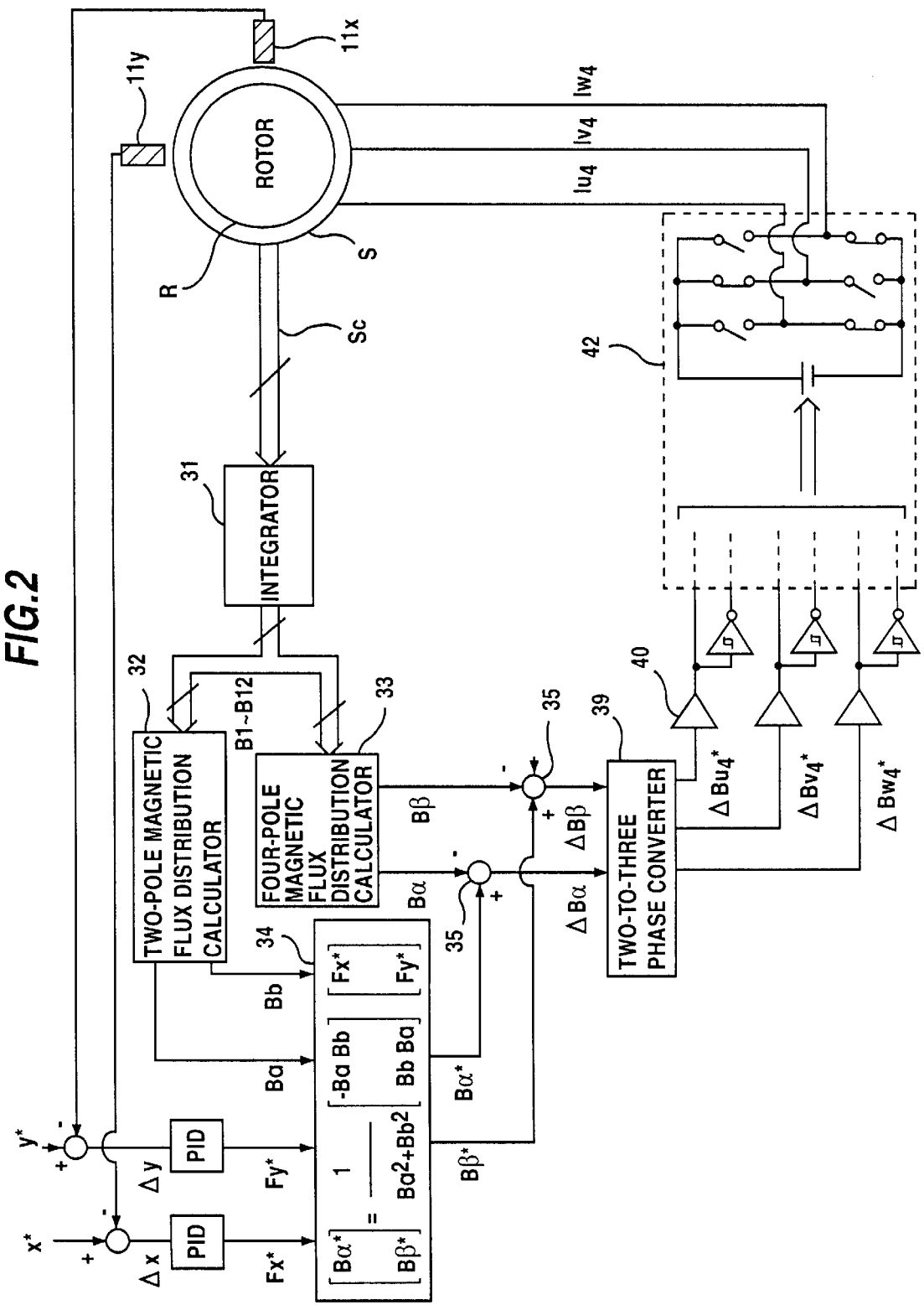
FIG. 2 is a block diagram of a control system of a bearingless rotary machine according to a first embodiment of the present invention.

FIG. 2 shown in block form a control system of a bearingless rotary machine according to a first embodiment of the present invention. The control system shown in FIG. 2 has a speed control system which is identical to the speed control system shown in FIG. 1 and will not be described in detail below, and a positional control system which is different from the positional control system shown in FIG. 1. In FIG. 1, the positional control system calculates the three-phase currents Iu4*, Iv4*, Iw4* as current commands for the four-pole windings on the stator S, and currents are supplied to the four-pole windings on the stator S according to the current commands. In FIG. 2, the positional control system includes a feedback circuit which calculates differences $\Delta B\alpha$, $\Delta B\beta$ between actual four-pole magnetic flux distribution vectors B$\alpha$, B$\beta$ detected by a four-pole magnetic flux distribution calculator 33 and four-pole magnetic flux distribution commands B$\alpha$*, B$\beta$*. The feedback generates four-pole magnetic flux distributions following to the four-pole magnetic flux distribution commands B$\alpha$*, B$\beta$* by correcting actual four-pole magnetic flux distribution B$\alpha$, B$\beta$.

Figure 3:
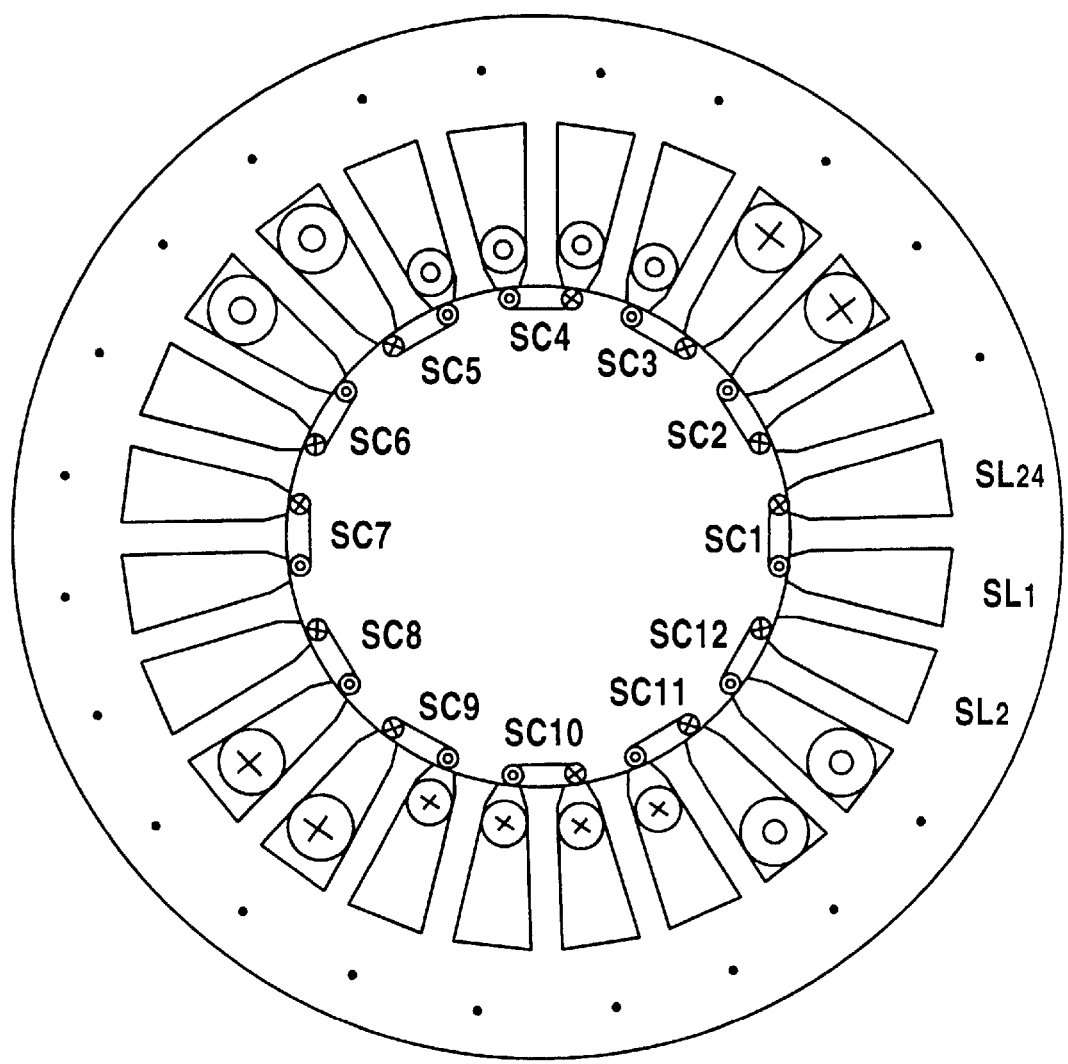
FIG. 3 is a cross-sectional view of a stator of the bearingless rotary machine.

As shown in FIG. 3, the stator S has search coils SC1–SC12 mounted on stator teeth for measuring a magnetic flux distribution in the gap between the stator S and the rotor R. As shown in FIG. 2, the positional control system has an integrator 31 for converting the induced voltages across the search coils SC1–SC12 to the voltages according to magnetic flux densities B1–B12 respectively, a two-pole magnetic flux distribution calculator 32 for calculating two-pole magnetic flux distribution vectors Ba, Bby from the magnetic flux densities B1–B12, and a four-pole magnetic flux distribution calculator 33 for calculating four-pole magnetic flux distribution vectors B$\alpha$, B$\beta$ from the magnetic flux densities B1–B12. The positional control system also has a positional control magnetic flux distribution command calculator 34 for calculating positional control magnetic flux distribution commands B$\alpha$*, B$\beta$* from the two-pole magnetic flux distribution vectors Ba, Bb calculated by the two-pole magnetic flux distribution calculator 32 and commands Fx*, Fy* for a control force to be generated.

Magnetic fluxes may be detected by semiconductor devices such as Hall-effect devices, magnetoresistance devices, etc. Such semiconductor devices may be either disposed in the gap between the stator and the rotor or embedded in a magnetic member of the stator for detecting a magnetic flux distribution for positional control of the rotor. However, the use of semiconductor devices is not practical as they suffer various drawbacks as follows:

(1) If the temperature of a region to be measured for a magnetic flux raises outside of a normal operating range of a semiconductor device as a detecting device, the semiconductor device cannot accurately detect a magnetic flux. The semiconductor device may possibly be broken when placed in an extreme temperature environment.

(2) The magnetic member of the stator has to be cut or otherwise machined to provide a space for installing a semiconductor device as a detecting device therein. The cut or otherwise machined magnetic member changes a magnetic flux distribution from its normal pattern, and a proper magnetic flux distribution cannot be measured.

(3) Since it is necessary to place electric wires connected to a semiconductor device as a detecting device within a small space in the stator, the estator is liable to lack practical levels of reliability and mechanical strength.

According to another process of detecting a magnetic flux distribution in the gap between the stator and the rotor, the voltage across windings present in a magnetic flux path in the stator is detected, and change of a magnetic flux is calculated from the detected voltage. This process is based on the fact that a change in the magnetic flux crossing the windings (a differential of the magnetic flux) and the voltage across the windings are proportional to each other according to the Faraday's laws of electromagnetic induction. If the number of turns of a winding used to detect a magnetic flux is represented by n, the magnetic flux linkaging the winding by Φ, and the area of the winging by S, then the voltage Vsc across the winding is expressed by:

$$Vsc = n\frac{d\Phi}{dt}$$

By substituting a magnetic flux density B=Φ/S and s=d/dt, the following equation is obtained:

$$Vsc = s \cdot nSB$$

A transfer function from B to Vsc is hereinafter indicated by Gsc.

If a detected magnetic flux density signal is indicated by Vout, then in order for the detected magnetic flux density signal Vout to be proportional to the magnetic flux density B, the following calculation is needed:

$$Vout = \frac{1}{s}Vsc$$

The above integration means that a large gain is necessary at very low frequencies, and is not feasible. As a practical solution, a low-pass filter (LPF) having a cutoff frequency fc and a DC gain A is used as an incomplete integrator, and is operated in a manner close to the operation represented by the above operation. Since a transfer function Gint at the incomplete integrator is expressed by:

$$Gint(t) = \frac{Vout}{Vin} = \frac{A}{\frac{s}{2\pi fc} + 1}$$

a transfer characteristic between the detected magnetic flux density signal Vout and the actual magnetic flux density B is given as follows:

$$\frac{Vout}{B} = Gsc \cdot Gint$$

$$= snS \cdot \frac{A}{\frac{s}{2\pi fc} + 1} = 2\pi fcnSA \cdot \frac{s}{s + 2\pi fc}$$

Therefore, it can be seen that the process of detecting a magnetic flux based on the voltage across the winding has detecting characteristics provided by a high-pass filter (HPF) having a gain $2\pi fcnSA$ and a cutoff frequency fc. This means that it cannot detect a magnetic flux that varies in a long period.

FIG. 3 shows in cross section the stator S taken along a plane perpendicular to the axis thereof. The stator S has 24 slots SL1–SL24 accommodating the four-pole winding, indicated by larger circles, disposed in a radially outer position and the two-pole winding, indicated by smaller circles, disposed in a radially inner position. The search coils SC1–SC12 are wound on the respective stator teeth between the slots SL1–SL24 at circumferentially equally spaced intervals.

Voltages across the search coils SC1–SC12 are integrated by the integrator 31 (see FIG. 2) to determine magnetic flux densities at the stator teeth on which the search coils SC1–SC12 are wound. The magnetic flux densities detected at the respective search coils SC1–SC12 are represented respectively by B1, B2, . . . B12.

The two-pole magnetic flux distribution vectors Ba, Bb are calculated from the detected magnetic flux densities B1–B12 by the two-pole magnetic flux distribution calculator 32 according to the following equations:

$$Ba = \frac{1}{6}\sum_{k=1}^{12}\left\{B_k \cdot \cos\left(\frac{k\pi}{6}\right)\right\}$$

$$Bb = \frac{1}{6}\sum_{k=1}^{12}\left\{B_k \cdot \sin\left(\frac{k\pi}{6}\right)\right\}$$

The four-pole magnetic flux distribution vectors Bα, Bβ are calculated from the detected magnetic flux densities B1–B12 by the four-pole magnetic flux distribution calculator 33 according to the following equations:

$$B\alpha = \frac{1}{6}\sum_{k=1}^{12}\left\{B_k \cdot \cos\left(\frac{k\pi}{3}\right)\right\}$$

$$B\beta = \frac{1}{6}\sum_{k=1}^{12}\left\{B_k \cdot \sin\left(\frac{k\pi}{3}\right)\right\}$$

As shown in FIG. 2, the calculated two-pole magnetic flux distribution vectors Ba, Bb and the positional control force commands Fx*, Fy* are supplied to the positional control magnetic flux distribution command calculator 34, which then calculates positional control magnetic flux distribution commands Bα*, Bβ*.

The calculated four-pole magnetic flux distribution vectors Bα, Bβ are subtracted from the positional control magnetic flux distribution commands Bα*, Bβ* by a subtractor 35, which thus calculates differences ΔBα, ΔBβ between the positional control magnetic flux distribution commands Bα*, Bβ* and the calculated four-pole magnetic flux distribution vectors Bα, Bβ.

The differential signals ΔBα, ΔBβ thus calculated are then converted by a two-to-three phase converter 39 to magnetic flux density distribution commands ΔBu4*, ΔBv4*, ΔBw4* for the respective three-phase windings of the stator S. The differential signals ΔBα, ΔBβ are checked for sign by hysteresis comparators 40, and used as on/off control signals for the power elements of a three-phase inverter device (power amplifier) 42. Specifically, if the differential signals ΔBα, ΔBβ have a positive sign, then they act to make negative currents Iu4, Iv4, Iw4 supplied from the inverter device 42 to the windings of the stator S, i.e., to reduce the currents Iu4, Iv4, Iw4, for thereby eliminating the differential signals ΔBα, ΔBβ. In this manner, the magnetic flux distribution in the gap between the stator S and the rotor R follows the positional control magnetic flux distribution commands Bα*, Bβ* without a delay. As a result, a positional control magnetic flux distribution can be achieved in the gap between the stator S and the rotor R as expected.

In an experiment conducted by the inventors, the control system shown in FIG. 2 was used to detect actual magnetic flux densities and the detected magnetic flux densities were feedback-controlled to achieve a desired positional control magnetic flux distribution in the gap between the stator S and the rotor R, for thereby magnetically levitating and supporting the squirrel-cage type rotor R as desired.

In the first embodiment shown in FIGS. 2 and 3, the search coils SC1–SC12 are used to detect an actual magnetic flux distribution in the gap between the stator S and the rotor R. However, Hall-effect devices may alternatively be used to detect an actual magnetic flux distribution. The Hall-effect devices are advantageous in that they do not suffer a reduction in the detection sensitivity at low frequencies, which the search coils tend to be subject to, and the low-pass filter can be dispensed with.

According to the first embodiment, as described above, an actual magnetic flux distribution is detected and feedback-controlled to achieve a desired magnetic flux distribution. When a magnetic flux distribution in the gap between the stator and the rotor of a bearingless rotary machine is detected and controlled, the rotor can stably be magnetically levitated regardless of the configuration of the rotor, especially unwanted flux distribution generated by squirrel-cage type rotor.

Figure 4:
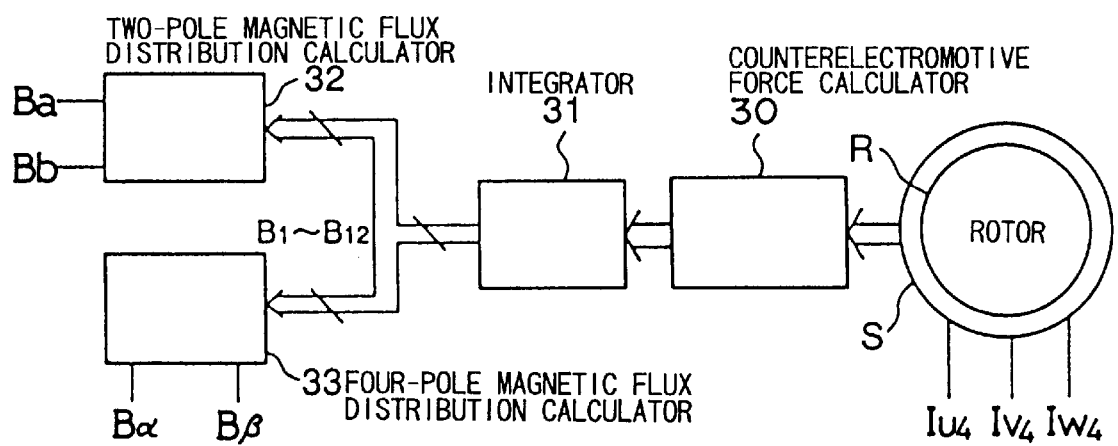
FIG. 4 is a block diagram of a central portion of a control system of a bearingless rotary machine according to a second embodiment of the present invention.

FIG. 4 shows in block form a central portion of a control system of a bearingless rotary machine according to a second embodiment of the present invention. The control system shown in FIG. 4 is capable of detecting a magnetic flux distribution in the gap between the stator and the rotor and correcting an error between the detected magnetic flux distribution and a magnetic flux distribution command to stably levitate the rotor, without specially added devices for detecting the magnetic flux distribution in the gap between the stator and the rotor. Specifically, as shown in FIG. 4, changes of magnetic fluxes crossing windings mounted on the stator S, i.e., three-phase two-pole drive windings and three-phase four-pole positional control windings, generate counter-electromotive voltages induced across the windings, and to be integrated to derive an actual magnetic flux distribution in the gap between the stator S and the rotor R. To determine such an actual magnetic flux distribution, the control system has measuring units (not shown) for measuring voltages across and currents through the two-pole drive windings in the U, V, W phases and also voltages across and currents through the four-pole positional control windings in the U, V, W phases. The control system also has a counter-electromotive voltage calculator 30 for calculating counter-electromotive voltage from the measured voltages and currents, and an integrator 31 for converting the calculated counter-electromotive voltages to magnetic fluxes for thereby determining an actual magnetic flux distribution in the gap between the stator S and the rotor R.

Since the derived actual magnetic flux distribution tends to differ from the magnetic flux distribution command when disturbed by induced currents (secondary currents) in the rotor R, signs of currents to be supplied to the windings on the stator S are determined depending on the sign of the difference between the actual magnetic flux distribution and the magnetic flux distribution command, and the actual magnetic flux distribution is feedback-controlled in order to eliminate the difference. This control process is identical to the control process carried out by the control system shown in FIG. 2.

Figure 5A:
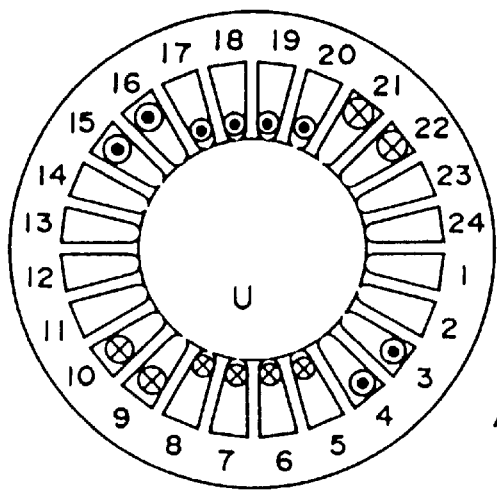
FIGS. 5A, 5B, and 5C are views of a stator winding structure of the bearingless rotary machine, showing distributions of two-pole and four-pole windings in U phase, V phase, and W phase, respectively, on a stator.
Figure 5B:
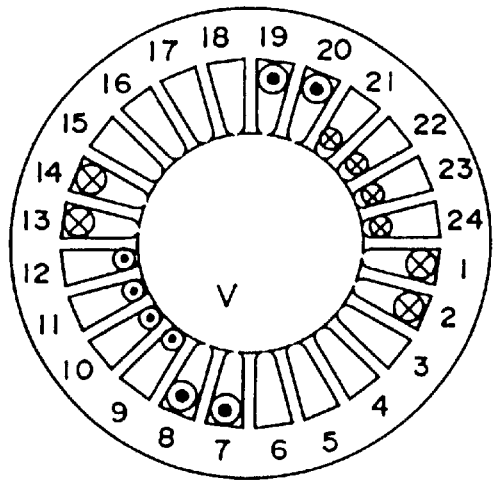
Figure 5C:
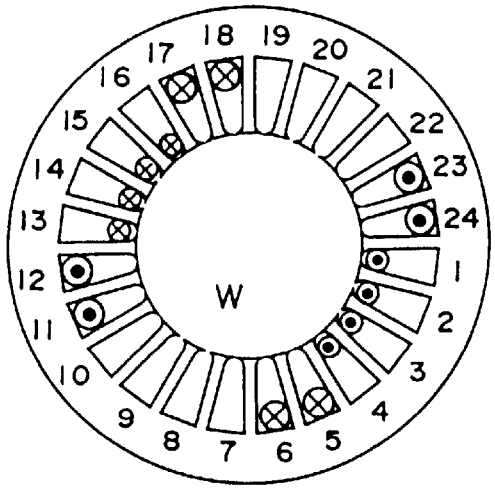

FIGS. 5A, 5B, and 5C are diagrams of a stator winding structure of the bearingless rotary machine, showing distributions of two-pole and four-pole windings in U phase, V phase, and W phase, respectively, on the stator s in the second embodiment. If magnetomotive force of the two-pole and four-pole windings have a complete sine-wave distribution, then their mutual inductance is nil, the voltages across the two-pole windings depend only on the magnetic flux distribution from the two-pole windings, and the voltages across the four-pole windings depend only on the magnetic flux distribution from the four-pole windings. Based on this phenomenon, it is possible to extract the magnetic flux distribution from the two-pole windings and the magnetic flux distribution from the four-pole windings separately from the gap magnetic flux distribution between the stator and the rotor. AS shown in FIGS. 5A–5C, the actual winding distributions contain odd-numbered harmonics unlike the above assumption. However, since third harmonics are eliminated upon conversion to an orthogonal coordinate system, i.e., conversion from three phases to two phases, and fifth and higher harmonics are sufficiently smaller than the fundamental, the harmonics do not cause any problem to the detection of the magnetic flux distribution in the second embodiment.

According to the second embodiment, as described above, an actual magnetic flux density distribution is determined from the voltages across the stator windings, and feedback-controlled to achieve a desired magnetic flux density distribution. By thus detecting a magnetic flux distribution in the gap between the stator and the rotor without any special device for detecting such a magnetic flux distribution, the rotor of the bearingless rotary machine can stably magnetically levitated regardless of the configuration of the rotor. If special devices for detecting magnetic fluxes, such as search coils, are employed, extra spaces are required to accommodate such search coils, and the number of cables used is increased, resulting in a complex arrangement. The control system according to the second embodiment, however, is more practical, simpler, and less expensive as it needs no extra spaces and cables.

Figure 6:
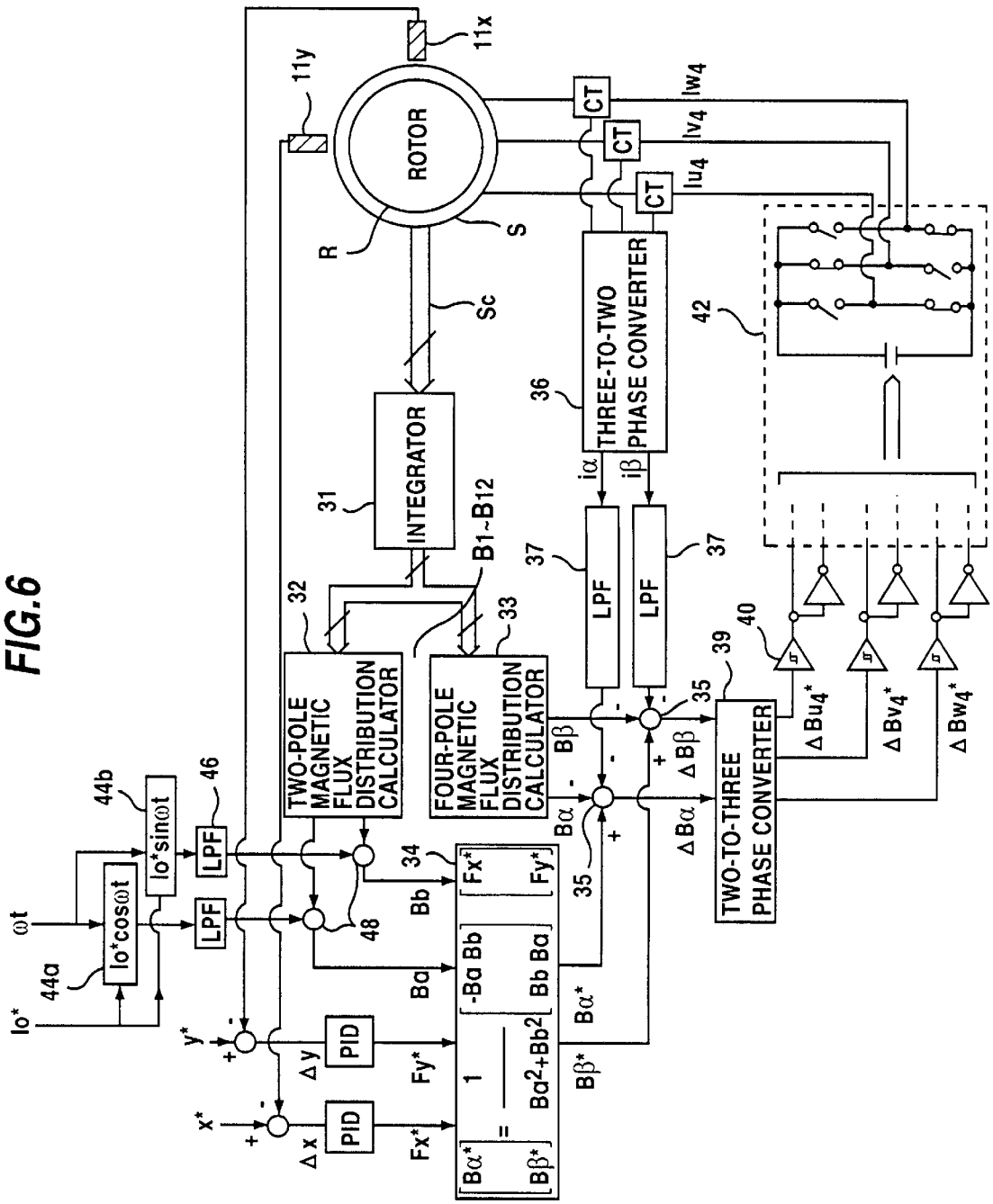
FIG. 6 is a block diagram of a control system of a bearingless rotary machine according to a third embodiment of the present invention.

FIG. 6 shows in block form a control system of a bearingless rotary machine according to a third embodiment of the present invention. The control system according to the third embodiment integrates counter-electromotive voltages induced by the detecting windings to determine a magnetic flux distribution in the gap between the stator and the rotor, with an increased low-frequency range for detection. The control system according to the third embodiment has a speed control system for controlling currents flowing through the two-pole drive windings on the stator. Such a speed control system is identical to the speed control system shown in FIG. 1, and hence is omitted from illustration.

The process of detecting a magnetic flux distribution by integrating counter-electromotive voltages induced by the stator windings is problematic in that low-frequency components are detected at an attenuated level. Specifically, as described above, a detected value B' of the actual magnetic flux B depends on the cutoff frequency fc of the integrator 31, as follows:

$$\frac{B'}{B} = \frac{s}{s + 2\pi fc}$$

Since this process is unable to detect low-frequency magnetic flux variations, it has an uncontrollable range. For example, if the rotating drive magnetic field rotates at a low speed, then because magnetic flux variations at search coils are slow, it is not possible to determine a magnetic flux distribution under this condition. This means that the rotor cannot be levitated satisfactorily when its rotational speed is low. It is thus necessary to extend the lower limit of a frequency range in which the magnetic flux distribution can be detected.

The control system includes a correcting circuit for compensating or substituting low-frequency components of winding currents which generate the magnetic field from the stator for low-frequency components of the magnetic flux distribution. The correcting circuit operates as follows: When the detected magnetic flux distribution obtained by incompletely integrating counter-electromotive voltages induced by the windings on the stator has a frequency characteristic represented by:

[the magnetic flux distribution detected by the windings]/[the actually generated magnetic flux distribution]=$s/(s+2\pi fc)$, where fc is the cutoff frequency of the incomplete integrator, the correcting circuit compensates for low-frequency components by adding the low-frequency components of the winding currents which generate the magnetic field, expressed by:

{$2\pi fc/(s+2\pi fc)$}×[the winding currents which generate the magnetic field], as low-frequency components of the detected magnetic flux distribution.

For the sake of brevity, a magnetic flux to be detected is represented by B, and a stator winding current which generates the magnetic flux is represented by I. It is assumed that B and I are related to each other, using a constant k inherent in the bearingless rotary machine, as follows:

$I = k \cdot B$

A detected value B' of the magnetic flux B, which is detected by calculating counter-electromotive voltages induced across the winding, is attenuated according to the equation:;

$$\frac{B'}{B} = \frac{s}{s + 2\pi fc}$$

Since the amount of magnetic flux that is eliminated due to the attenuation is expressed by:

$$B - B' = \left(1 - \frac{s}{s + 2\pi fc}\right) B$$

$$= \frac{2\pi fc}{s + 2\pi fc} B$$

The eliminated amount of magnetic flux represented by the above equation is compensated up for by a current which generates a rotating magnetic field to be compensated. The current, represented by I', is expressed as follows:

$$I' = k(B - B') = k \frac{2\pi fc}{s + 2\pi fc} I$$

These calculated values are used to correct the detected magnetic flux as follows:

$B' + I'$

The corrected detected magnetic flux is used to control the magnetic flux distribution.

Usually, the proportional relationship ($I = k \cdot B$) between the current and the magnetic flux is not established because of the effect of induced rotor currents. In a range where the magnetic flux changes slowly, i.e., in a low-frequency range, however, the effect of induced rotor currents is very small. Therefore, when the current I' expressed by:

$I' = k(B - B')$ is compensated, an error between the magnetic flux distribution caused by the induced secondary currents of the rotor and the distribution of the currents in the stator windings poses no problem in the frequency range under consideration. By supplying low-frequency currents to generate a magnetic field to the windings of the stator, magnetic fluxes are generated by the supplied low-frequency currents as a substitute for a magnetic flux distribution which is attenuated largely in a low-frequency range lower than the cutoff frequency fc. Consequently, the rotor can stably be magnetically levitated and supported in the low-frequency range lower than the cutoff frequency fc.

The control system of the bearingless rotary machine according to the third embodiment of the present invention, shown in FIG. 6, is designed to solve the above problems. As described above, the speed control system for controlling currents flowing through the two-pole drive windings on the stator is identical to the speed control system shown in FIG. 1, and hence is omitted from illustration. The positional control system shown in FIG. 6 has:

(1) mechanisms CT for detecting four-pole positional control currents;

(2) a three-to-two phase converter 36 for converting current signals detected by the mechanisms CT to current signals in an orthogonal coordinate system so as to match the control system;

(3) low-pass filters (LPF) 37 for passing low-frequency components of the current signals in the orthogonal coordinate system; and (4) adders 35 for substituting low-frequency components of four-pole control currents for attenuated low-frequency components of output signals Bα, Bβ from the four-pole magnetic flux distribution calculator 33.

The control system for controlling the two-pole magnetic flux distribution has:

(5) calculators 44a, 44b for calculating excitation current components for the two-pole windings on the stator from the signals Io*, ωt derived by the rotational speed control system;

(6) low-pass filters (LPF) 46 for passing low-frequency components of the excitation current components of the two-pole windings on the stator; and (7) adders 48 for substituting low-frequency components of the currents for attenuated low-frequency components of output signals Ba Bb from the two-pole magnetic flux distribution calculator 32.

The low-pass filters 37, 46 and the integrator 31 shown in FIG. 6 have the same cutoff frequency fc and also have first-order attenuating characteristics (20 dB/decade). Since the characteristics of the low-pass filter (integrator) 31 for controlling the detected amount of magnetic flux and those of the low-pass filters 37, 46 for controlling the current signals are the same as each other, the corrected detected magnetic flux will coincide with the actual magnetic flux in the entire frequency range. Specifically, the magnetic flux component:

$$B - B' = \left(1 - \frac{s}{s + 2\pi fc}\right)B$$
$$= \frac{2\pi fc}{s + 2\pi fc}B$$

which cannot be detected with the magnetic flux detecting characteristics:

$$\frac{B'}{B} = \frac{s}{s + 2\pi fc}$$

is made up for by the current component:

$$I' = k(B - B') = k\frac{2\pi fc}{s + 2\pi fc}I$$

so that B'/B=I, resulting in ideal detecting characteristics in the entire frequency range.

With the above elements added, the problems with respect to the frequency characteristics of the process of detecting magnetic fluxes based on the phenomenon of electromagnetic induction are solved. DC components of the detected magnetic fluxes cannot be detected as they do not induce voltages across the search coils. Therefore, the above current feedback loop is indispensable.

As described above, according to this embodiment, the frequency range in the process of detecting magnetic fluxes with the stator windings is extended to a DC level which the conventional process has failed to achieve. The magnetic flux detecting arrangement according to this embodiment is incorporated in the control system to greatly widen the range of operation of the bearingless rotary machine in which the rotor can stably be levitated and supported.

The principles of the third embodiment have been described with respect to the process of detecting magnetic fluxes with the search coils, but are also applicable to the process of detecting magnetic fluxes with the drive and positional control windings on the stator.

Figure 7:
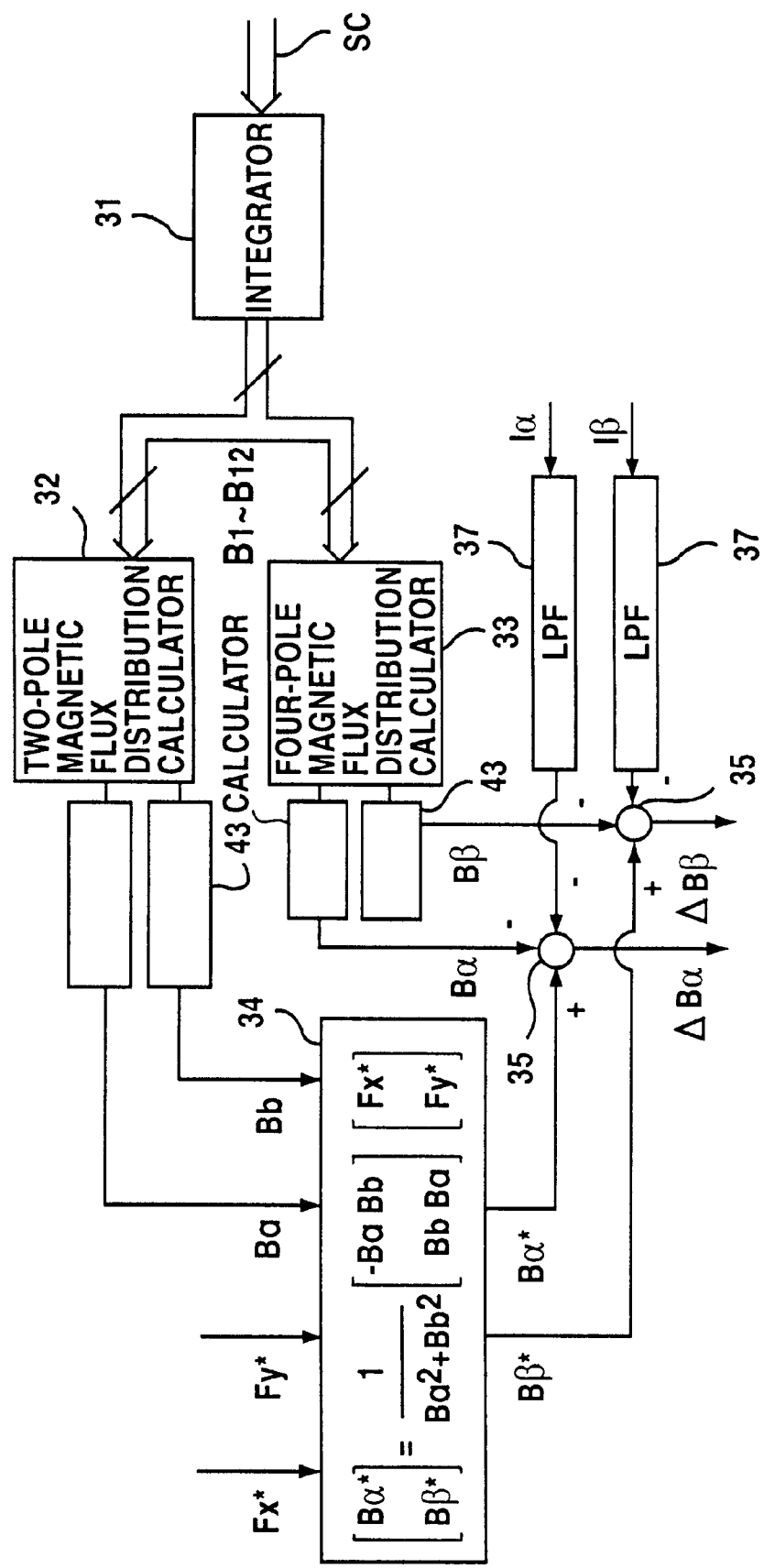
FIG. 7 is a block diagram of a control system of a bearingless rotary machine according to a fourth embodiment of the present invention.

FIG. 7 shows in block form a control system of a bearingless rotary machine according to a fourth embodiment of the present invention.

The above process is unable to detect low-frequency magnetic flux variations, and hence has an uncontrollable range. The control system of the bearingless rotary machine according to the fourth embodiment of the present invention, as shown in FIG. 7, is designed to eliminate the above drawbacks. The speed control system for controlling currents flowing through the two-pole drive windings on the stator is identical to the speed control system shown in FIG. 1, and hence is omitted from illustration. The positional control system shown in FIG. 7 resides in that:

(1) the output voltages from the search coils are supplied to an analog integrator 31; and
(2) detected magnetic flux distributions that are calculated are supplied to calculators 43, which effect calculations to widen the detecting frequency range.

The integration carried out by the analog integrator 31 indicates that a large gain is necessary at very low frequencies, and hence is not feasible. Therefore, low-pass filters (LPF) having a cutoff frequency fc are used as incomplete integrators, with the result that low-frequency variations of the magnetic flux cannot be detected. To overcome this difficulty, the analog low-pass filters are corrected by digital calculators. Specifically, the low-pass filters having a cutoff frequency fc are constructed as analog circuits, and output signals Vout from the low-pass filters are supplied to digital calculators. If transfer characteristics of the digital calculators are represented by Gcomp(s) and their output by Vout'. The purpose of this arrangement is to substantially reduce the cutoff frequency fc in the following equation:

$$\frac{Vout}{B} = 2\pi fcnSA \cdot \frac{s}{s + 2\pi fc}$$

In order to obtain magnetic flux detecting characteristics:

$$\frac{Vout'}{B} = Gsc(s)Gint(s)Gcomp(s)$$
$$= 2\pi fcnSA \cdot \frac{s}{s + 2\pi fc'}$$

due to the correction with the digital calculators, the transfer characteristics Gcomp(s) may be expressed by:

$$Gcomp(s) = \frac{1}{Gsc} \cdot \frac{1}{Gint} \cdot 2\pi fcnSA \cdot \frac{s}{s + 2\pi fc'}$$
$$= \frac{s + 2\pi fc}{s + 2\pi fc'}$$

The transfer characteristics Gcomp(s) are calculated by the digital calculators. In this manner, the cutoff frequency fc can be reduced to fc', thus widening the low-frequency control range.

When the analog integrator 31 used in the form of a low-pass filter has a cutoff frequency fc, the calculations performed by the digital calculators 43 realize a transfer function expressed by:

$$G(s)=(s+2\pi fc)/((s+2\pi fc'))$$

using a parameter s, where fc represents a lower limit of the detecting frequency range without the digital calculators and fc' a lower limit of the detecting frequency range when corrections are made by the digital calculators.

Heretofore, the frequency range for detecting magnetic fluxes has been governed by the cutoff frequency fc. According to the present invention, however, it is possible to lower the frequency range for detecting magnetic fluxes to fc' by using both the analog integrator 31 and the digital calculators 43. The digital calculators (integrators) 43 are positioned at a rear stage of the analog integrator 31 for the following reasons:

(1) The voltages across the search coils SC1–SC12 are mainly composed of a component having a switching frequency of the inverter (power amplifier), and the switching frequency is much higher than the sampling frequency of the digital calculators 43. Therefore, if the voltages across the search coils SC1–SC12 were directly applied to the digital calculators 43, it would not be possible to calculate magnetic fluxes accurately. Since the analog integrator 31 comprises a low-pass filter, it is effective to remove voltage variations depending on the switching frequency. Therefore, when the output signal from the analog integrator 31 is supplied to the digital calculators 43, the problem of the inverter noise is solved.

(2) The resolution of signals handled by the digital calculators 43 depends on the number of bits in A/D converters and D/A converters. If the voltage level of input signals or output signals is extremely low, then they will suffer a large quantizing error that makes it impossible to calculate magnetic fluxes accurately. If the integrator were composed of a digital calculator only, then the detecting frequency range would be extremely narrow because of the large quantizing error. According to the fourth embodiment shown in FIG. 7, since voltages across the search coils are first processed by the analog integrator 31, they will have a voltage level which does not cause a large quantizing error in the digital calculators 43.

(3) Generally, analog circuits such as the analog integrator 31 are less expensive than digital calculators. If the search coils SC1–SC12 happen to generate abnormally high voltages due to some trouble during operation of the bearingless rotary machine, then only inexpensive analog integrator 31 is broken, thus minimizing possible damage to the control system in case of emergency.

After the magnetic flux density signals B1–B12 are converted to the magnetic flux distribution signals Ba, Bb, B$\alpha$, B$\beta$, they are processed by the digital calculators 43 for the purpose of reducing the burden of digital calculations. Specifically, the control system shown in FIG. 7 has only four digital calculators 43, whereas if the magnetic flux density signals B1–B12 were to be corrected directly by digital calculators, then the control system would have to have a total of twelve digital calculators.

According to the fourth embodiment shown in FIG. 7, as described above, the detecting frequency range is widened in the process of detecting a magnetic flux distribution with the windings on the stator, for thereby making it possible to detect and control a magnetic flux distribution that varies in a long period. As a result, the range in which the bearingless rotary machine operates to stably levitate the rotor can greatly be increased. The correcting circuit according to the fourth embodiment shown in FIG. 7 may be combined with the correcting circuit according to the third embodiment shown in FIG. 6.

The principles of the fourth embodiment have been described with respect to the process of detecting magnetic fluxes with the search coils, but are also applicable to the process of detecting magnetic fluxes with the drive and positional control windings on the stator.

FIGS. 3 through 11A–11C illustrate a bearingless rotary machine according to a fifth embodiment of the present invention.

In each of the above embodiments, the voltages across the detecting windings are integrated to detect magnetic fluxes in the gap between the stator and the rotor. This process is sufficiently effective if the frequency of the rotating magnetic fields is higher than the limit frequency for detecting the magnetic fluxes. It is thus desirable to provide situations where the frequency of the rotating magnetic fields increases beyond the limit frequency for detecting the magnetic fluxes. If such a frequency variation were imparted to the positional control magnetic field, then it would vary the levitated position control force applied to the rotor, failing to achieve the inherent performance of the bearingless rotary machine. When a frequency variation is imparted to the drive magnetic field, if the bearingless rotary machine has a plurality of sets of rotors and stators, and also if the frequencies of the rotating magnetic fields of the respective stators are higher than the limit frequency for detecting the magnetic fluxes, and the frequency of the rotating magnetic field which is the sum of all rotating magnetic field vectors is lower than the limit frequency, then no problem arises out of the operation of the bearingless rotary machine. At each of the stators, the drive magnetic field has a frequency detectable by the detecting windings, but the levitated position of the rotor can stably be controlled even though the overall rotating magnetic field is in a frequency range lower than the limit frequency.

According to the fifth embodiment, the bearingless rotary machine has a single main shaft, a plurality of rotors fixedly mounted on the main shaft, and a plurality of stators for magnetically levitating and rotating the respective rotors. Each of the stators is capable of generating drive and positional control magnetic fields independently of each other. Control circuits for controlling the stators have an amplitude modulator and a frequency modulator for a current It* and an angle $\omega$t in a rotating coordinate system which are supplied to rotating-coordinate-to-fixed-coordinate converters, for individually controlling the amplitudes and rotational speeds of the drive magnetic fields acting on the rotors.

The rotors are fixedly mounted on the main shaft and magnetically levitated and rotated by the respective stators which are independent of each other. Even when the frequency of the overall drive magnetic field of the rotors is lower than a minimum frequency, the frequency modulator and the amplitude modulator can convert the frequencies of the drive magnetic fields of the respective stators to frequencies higher than the minimum frequency and assign generated drive forces to the respective frequencies of the stators. Therefore, the absolute values of the frequencies of the drive magnetic fields of the respective stators are made higher than the minimum frequency, and the amplitudes of the drive magnetic fields of the respective stators are made commensurate with the frequencies of the drive forces. Even if the magnetic flux distribution is distorted by secondary currents generated in the rotor current paths, the rotor can stably be levitated by adjusting the N pole positional control magnetic field of the stator.

When the overall rotational speed of the rotors drops below the minimum frequency, an M pole drive magnetic field having a frequency whose absolute value is higher than the minimum frequency is generated on each of the stators, and the sum of the frequencies is commensurate to a frequency corresponding to the rotational speeds of the rotors.

Therefore, when the rotational speed of the rotors drops below the minimum frequency, since an M pole drive magnetic field having a frequency whose absolute value is higher than the minimum frequency is generated on each of the stators, it is possible to detect a magnetic flux distribution in the gap between each stator and each rotor with detecting windings. Even though the M pole drive magnetic field has a frequency whose absolute value is higher than the minimum frequency, when the sum of the magnetic field vectors of the rotors has a frequency corresponding to the rotational speed of the rotors, the main shaft on which the rotors are fixedly mounted can rotate at the desired rotational speed lower than the minimum frequency. Therefore, even when the rotational speed of the rotors is equal to a frequency which cannot be detected by windings on the stators, the rotors can stably be magnetically levitated and supported.

While the magnitudes of the drive forces generated by the stators independent of each other correspond to the frequency of the M pole drive magnetic field, the magnitudes of the drive forces generated by the stators are assigned such that the sum of the drive force vectors will serve as a drive force generated by the rotors as a whole. Consequently, even when the rotational speed of the rotors is lower than the minimum frequency detectable by the windings on the stators, a desired generated drive force can be imparted to the stators as a whole. As a result, the rotors can stably be magnetically levitated and supported and given a desired torque even in a low-frequency range that cannot be detected by the windings on the respective stators.

The drive forces generated by the stators have magnitudes corresponding to the frequency of the M pole drive magnetic field, and the sum of the drive forces generated by the stators serves as a drive force generated by the rotors as a whole.

Figure 8:
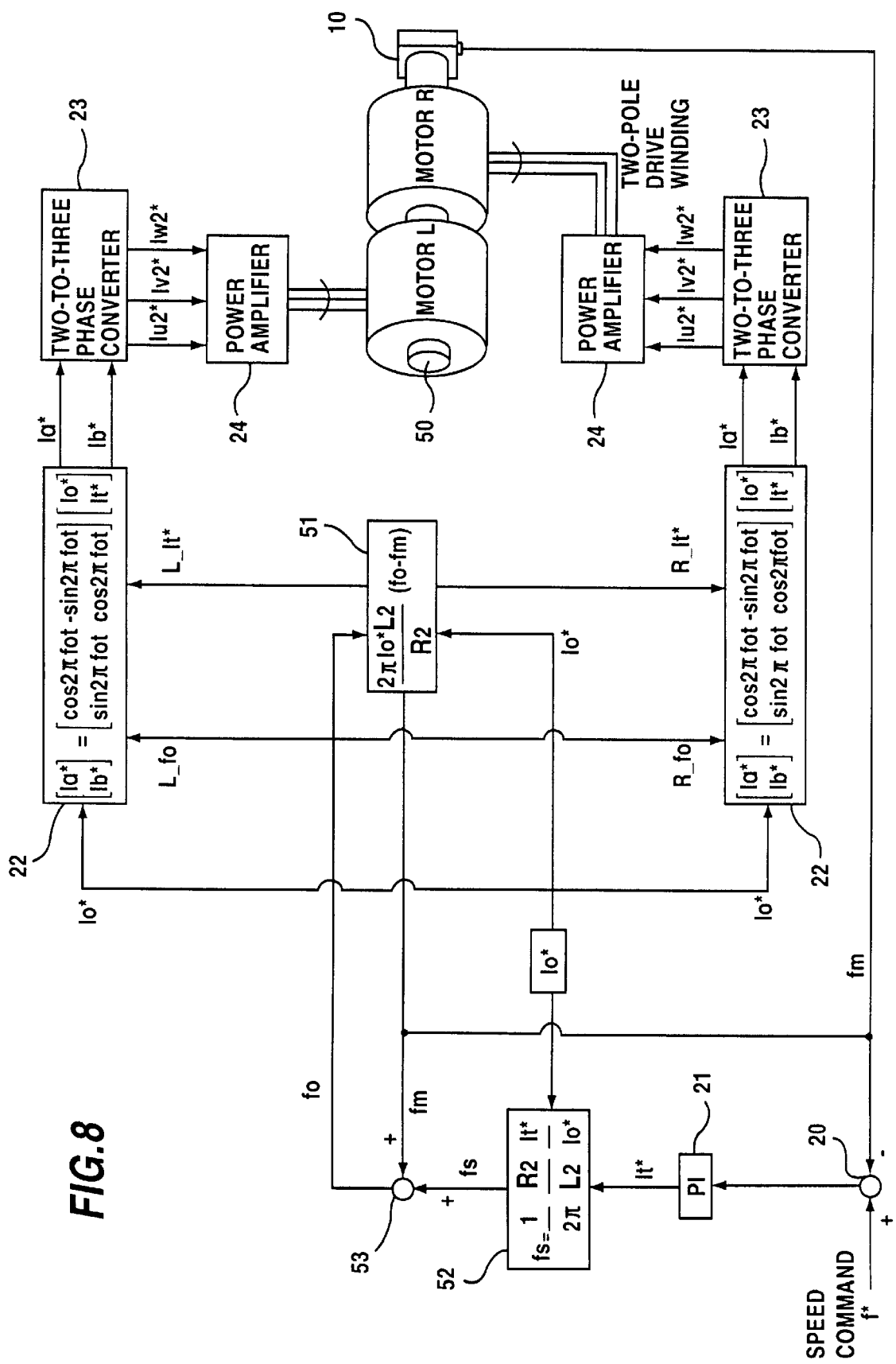
FIG. 8 is a block diagram of a control system of a bearingless rotary machine according to a fifth embodiment of the present invention, where the absolute value of a drive magnetic field frequency is higher than a minimum frequency.
Figure 9:
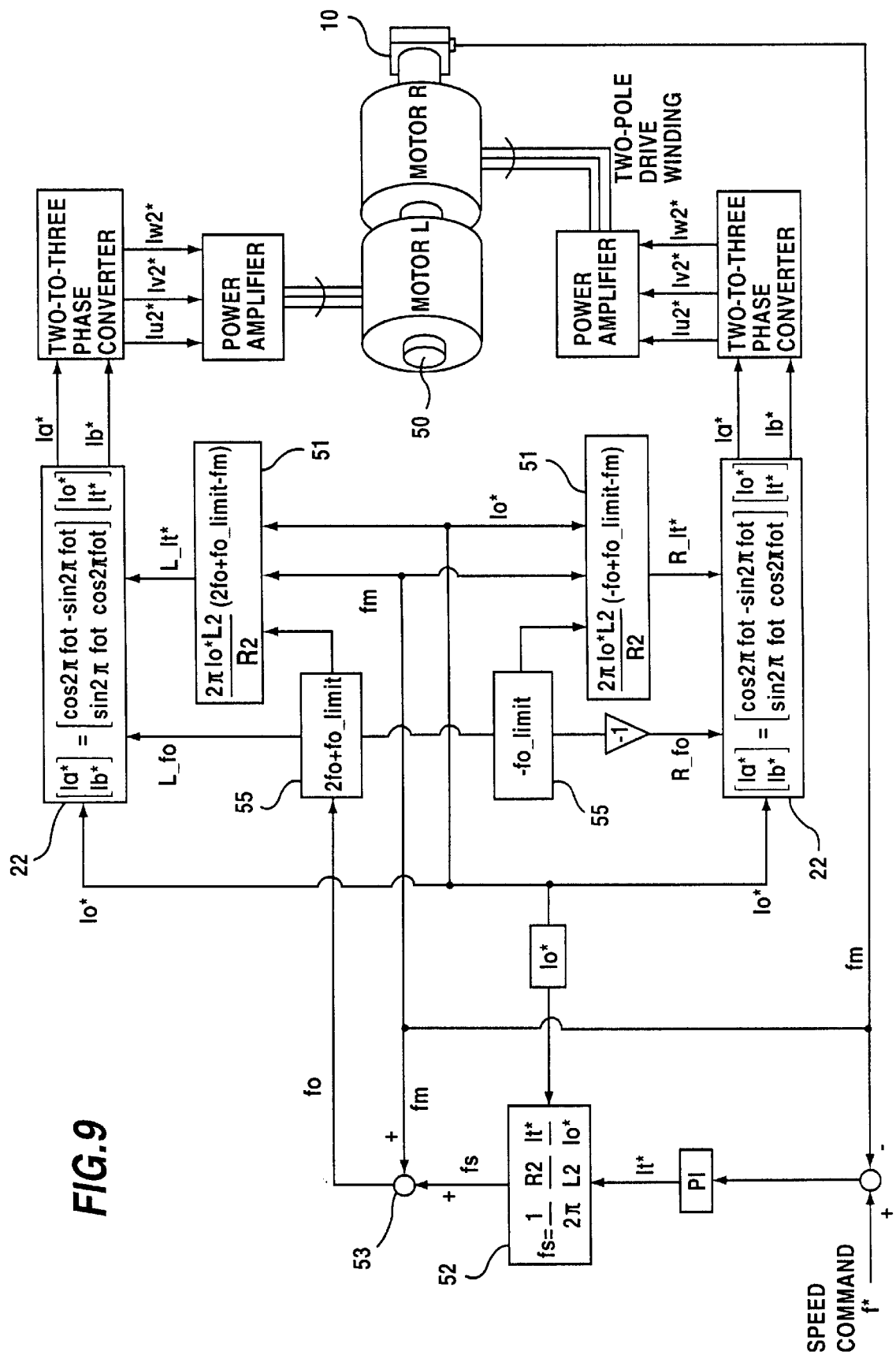
FIG. 9 is a block diagram of the control system of the bearingless rotary machine according to the fifth embodiment of the present invention, where a drive magnetic field frequency is positive and lower than the minimum frequency.
Figure 10:
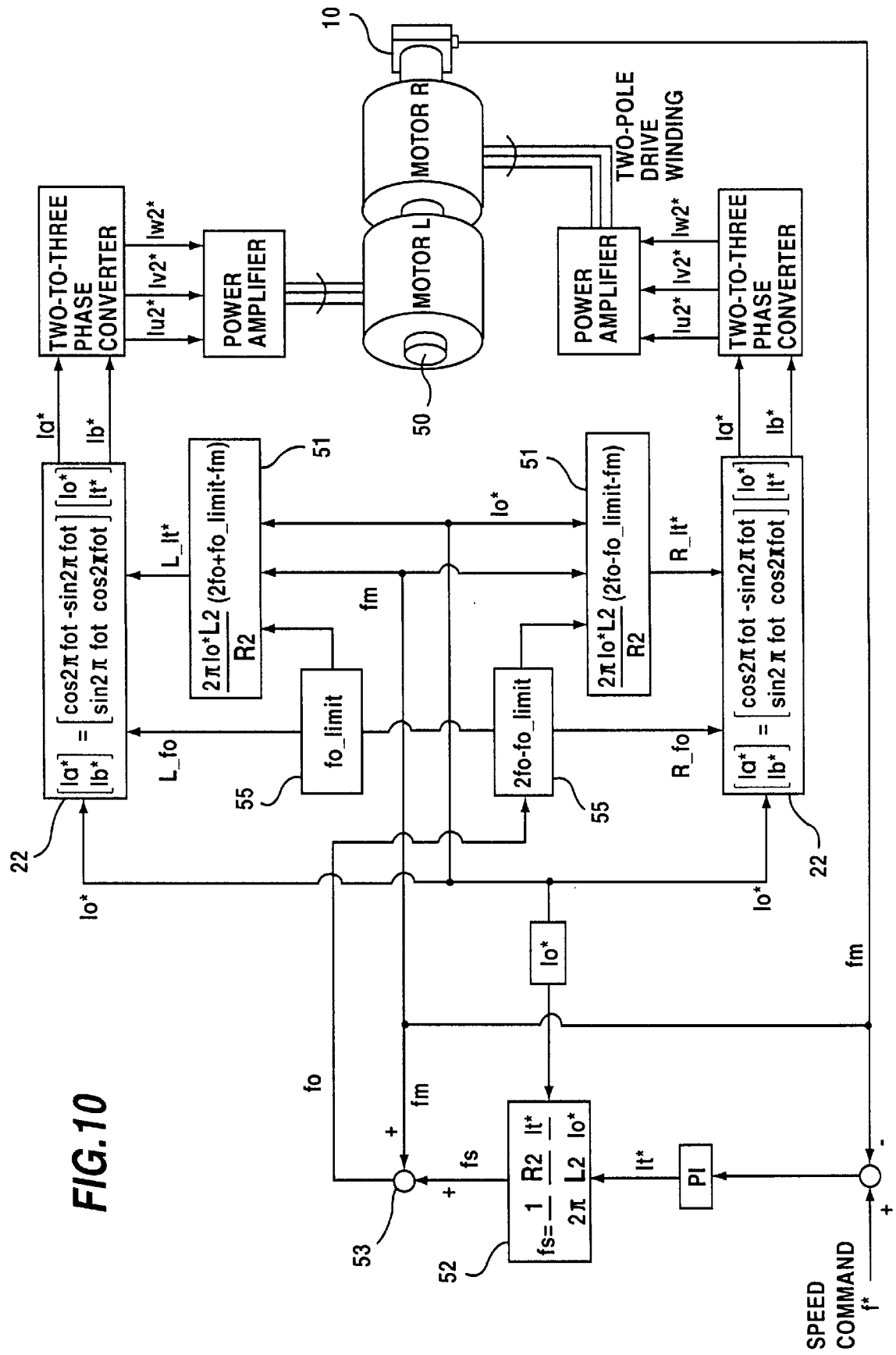
FIG. 10 is a block diagram of the control system of the bearingless rotary machine according to the fifth embodiment of the present invention, where a drive magnetic field frequency is negative and lower than the minimum frequency.

FIGS. 8 through 10 show in block form a control system of the bearingless rotary machine according to the fifth embodiment of the present invention. In the fifth embodiment, two squirrel-cage type rotors are fixedly mounted on a main shaft 50, and magnetically levitated and rotated by respective independent stators. These rotors and stators provide a motor L and a motor R. A rotational speed detector 10 is attached to an end of the main shaft 50 for detecting an actual rotational speed $f_m$ of the main shaft 50. The control system shown in FIGS. 8 through 10 has a levitated position control system for supplying control currents to four-pole positional control windings. The levitated position control system is identical to the control system shown in FIG. 2, and is omitted from illustration. FIGS. 8 through 10 show a rotational drive control system for supplying control currents to two-pole drive windings.

In FIG. 8, the absolute value of a drive magnetic field frequency $f_0$ is higher than a minimum frequency $f_{0\ limit}$ which is a limit frequency that can be detected. Therefore, $$f_0 > f_{0\ limit}$$

or $$f_0 < -f_{0\ limit}$$

In FIG. 9, the drive magnetic field frequency $f_0$ is smaller than the minimum frequency $f_{0\ limit}$. Therefore, $$0 < f_0 < f_{0\ limit}$$

In FIG. 10, the drive magnetic field frequency $f_0$ is negative and in the following range:

$$-f_{0\ limit} < f_0 < 0$$

The sign "−" represents a reverse rotation. The drive magnetic field frequency $f_0$ is the frequency of a rotational drive magnetic field which is the sum of the actual rotational speed $f_m$ of the rotors and a slip frequency $f_n$.

If the absolute value of the drive magnetic field frequency $f_0$ is higher than the minimum frequency $f_{0\ limit}$, as shown in FIG. 8, the rotating magnetic field can be detected by search coils $S_c$. In this case, a frequency modulator and an amplitude modulator, described later on, are not employed, but the frequency $f_0$ and the torque-related current It* are supplied directly to rotating-coordinate-to-fixed-coordinate converters 22.

In this case, the rotational drive control system operates as follows:

A speed (frequency) command f* is compared by a comparator 20 with a rotational frequency $f_m$ of the main shaft 50 which is detected by the rotational speed detector 10, and the difference between the speed command f* and the rotational frequency $f_m$ is supplied to a PI controller 21, which outputs a torque-related current command It* in order to eliminate the difference. An excitation-related current Io* is of a predetermined constant value. The torque-related current command It* and the excitation-related current Io* are supplied to a slip frequency calculator 52, which calculates a slip frequency $f_n$. The slip frequency $f_n$ is added to the rotational frequency $f_m$ of the main shaft 50 by an adder 53, which outputs a drive magnetic field frequency $f_0$ as the sum. The drive magnetic field frequency $f_0$ is supplied to the rotating-coordinate-to-fixed-coordinate converters 22 for the motors L, R. A torque-related current modulator 51 outputs the torque-related current It* to the rotating-coordinate-to-fixed-coordinate converters 22 for the motors L, R.

Since the drive magnetic field frequency $f_0$ is higher than the minimum frequency in each of the motors L, R, a magnetic flux distribution in the gap between the stator and the rotor can easily be detected. Even when secondary currents are generated in the current paths of the rotors, distorting the magnetic flux distribution from the desired distribution for controlling the levitated position, the distorted magnetic flux distribution can be corrected into the desired distribution by controlling the currents for the four-pole positional control windings as shown in FIG. 2.

In FIG. 9, the drive magnetic field frequency $f_0$ is smaller than the minimum frequency $f_{0\ limit}$ which is the limit frequency detectable by the search coils. In this case, the drive magnetic field frequency $f_0$ and the torque-related current It* which are supplied to the rotating-coordinate-to-fixed-coordinate converters 22 are converted to different quantities for the motors L, R by frequency modulators 55 and torque-related current (amplitude) modulators 51. Specifically, the frequency modulators 55 convert the drive magnetic field frequency $f_0$ to:

$$L\_f_0 = 2f_0 + f_{0\ limit}$$

which is a frequency for the motor L, and convert the drive magnetic field frequency $f_0$ to:

$$R\_f_0 = -f_{0\ limit}$$

which is a frequency for the motor R. One of the torque-related current modulators 51 converts the torque-related current It* to:

$$L\_It^* = \frac{2\pi l_0^r L_2}{R_2}(2f_0 + f_{0limit} - f_m)$$

and supplies the converted current to the coordinate-to-fixed-coordinate converter 22 for the motor L. The other torque-related current modulator 51 converts the torque-related current It* to:

$$R\_It^* = \frac{2\pi l_0^r L_2}{R_2}(-f_{0limit} - f_m)$$

and supplies the converted current to the coordinate-to-fixed-coordinate converter 22 for the motor R.

In this manner, the absolute value of each of the frequencies of the drive magnetic fields of the motors L, R becomes greater than the minimum frequency $f_{0limit}$, making it possible to detect a magnetic flux distribution in the gap between the stator and the rotor with the search coils. The frequency of the combined drive magnetic fields of the motors L, R is equal to the sum of the vectors of $L\_f_0$, $R\_f_0$, and becomes a frequency corresponding to the speed command f* lower than the limit frequency for detecting the rotating magnetic field. A combined torque current which is equal to the sum of the vectors of the torque-related currents of the motors L, R is expressed by:

$$(L\_It^*) + (R\_It^*)$$

and corresponds to the torque-related current command It*.

Since the combined frequency and torque-related current command which are the vector sum of the motors L, R become commands prior to being converted, the levitated positions of the rotors can stably be controlled in the frequency range lower than the detecting limit frequency of the search coils.

In FIG. 10, the drive magnetic field frequency $f_0$ is negative and the absolute value thereof is smaller than the minimum frequency which is the detecting limit frequency of the search coils. That is, $$-f_{0\ limit} < f_0 < 0$$

In this case, the drive magnetic field frequency $f_0$ and the torque-related current It* which are supplied to the rotating-coordinate-to-fixed-coordinate converters 22 are converted to different quantities for the motors L, R by the frequency modulators 55 and the torque-related current (amplitude) modulators 51. Specifically, the frequency modulators 55 convert the drive magnetic field frequency $f_0$ to:

$$L\_f_{0\ limit}$$

which is a frequency for the motor L, and convert the drive magnetic field frequency $f_0$ to:

$$R\_f_0 = 2f_0 - f_{0\ limit}$$

which is la frequency for the motor R. One of the torque-related current modulators 51 converts the torque-related current It* to:

$$L\_It^* = \frac{2\pi I_0^r L_2}{R_2}(f_{0limit} - f_m)$$

and supplies the converted current to the coordinate-to-fixed-coordinate converter 22 for the motor L. The other torque-related current modulator 51 converts the torque-related current It* to:

$$R\_It^* = \frac{2\pi I_0^r L_2}{R_2}(2f_0 - f_{0limit} - f_m)$$

and supplies the converted current to the coordinate-to-fixed-coordinate converter 22 for the motor R.

The control system is switched according to the above three conditions with respect to the frequency $f_0$ for thereby generating desired drive forces while rotating the drive magnetic forces under any operating conditions of the bearingless rotary machine.

Figure 11A:
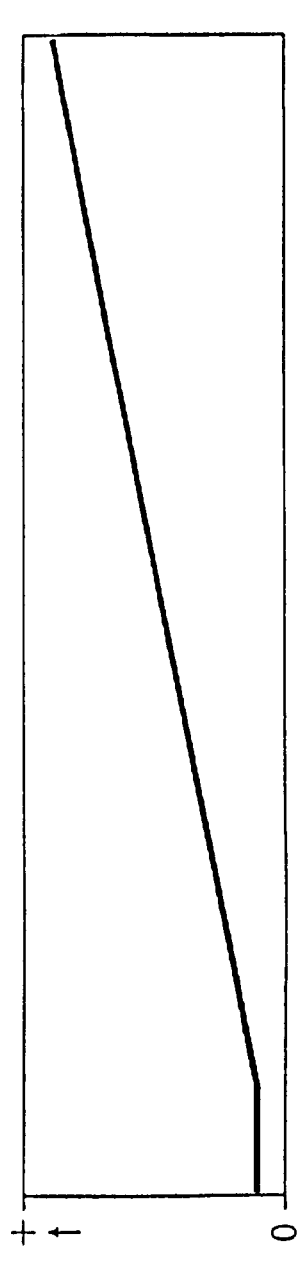
FIGS. 11A, 11B, and 11C are diagrams showing a rotational speed, a shaft displacement in a horizontal direction, and a shaft displacement in a gravitational direction, respectively, accomplished by the control system of the bearingless rotary machine according to the fifth embodiment of the present invention.
Figure 11B:
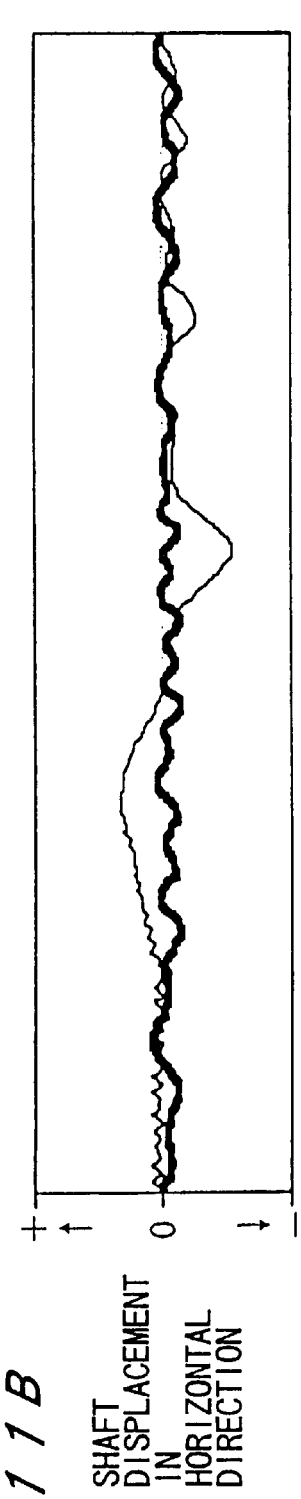
Figure 11C:
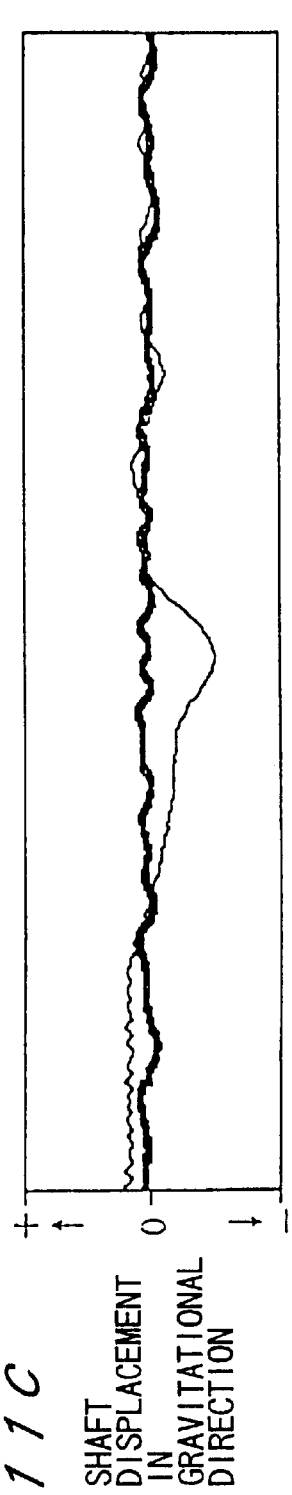

FIGS. 11A through 11C show a rotational speed, a shaft displacement in a horizontal direction, and a shaft displacement in a gravitational direction, respectively, which were accomplished by the control system shown in FIGS. 8 through 10 to control the levitated position of the rotors. In FIGS. 11A through 11C, the thicker curves were plotted when the frequency of the stators was varied above the minimum frequencies, and the thinner curves were plotted when the frequency $f_0$ and the torque-related current command It* were applied directly to the stators according to the conventional process. In order to increase the rotational speed, secondary currents are necessarily generated to impart rotational forces to the rotors. According to the conventional process, as indicated by the thinner curves, since magnetic flux variations in the gap between the stator and the rotor due to secondary currents cannot be compensated for when the rotors rotate at a low speed, the shaft displacements are largely varied as the rotational speed increases. The control system according to the present embodiment, however, can stably magnetically levitate and support the rotors regardless of whether secondary currents are generated or not, because magnetic fluxes that cannot be detected are not generated by the stators.

According to the fifth embodiment, as described above, drive magnetic fields whose frequency is higher than the minimum frequency detectable by the detecting windings under any operating conditions are generated by the stators to make the magnetic levitation controllability free of the detecting limit of the magnetic flux detecting mechanism. Consequently, the rotors can stably be magnetically levitated and supported when the rotors are stopped or accelerated or decelerated at low speeds.

In the above embodiments, the drive windings for producing a drive magnetic field distribution and the positional control windings for producing a positional control magnetic field distribution have been described as being separate from each other. However, windings of any form may be employed insofar as they can produce a desired magnetic field distribution. It is assumed that the windings on the stators are three-phase windings with respective ends connected at a common point. However, the windings may be connected in any pattern insofar as they can produce the above magnetic field distribution. The principles of the present invention are applicable to any number of poles insofar as the M poles of the rotating drive magnetic field and the N poles of the positional control magnetic field are related to each other as follows:

$$N = M \pm 2$$

Although certain preferred embodiments of the present invention has been shown and described in detail, it should be understood that various changes and modifications may be made therein without departing from the scope of the appended claims.

What is claimed is:

1. A bearingless rotary machine comprising:

a rotor having secondary current paths;

a stator spaced from said rotor by a gap, said stator having two kinds of windings for imparting a rotating force to said rotor with a rotating M pole drive magnetic field and a levitating and supporting force to said rotor with a rotating N pole control magnetic field added in synchronism with said rotating M pole drive magnetic field, where N=M±2;

displacement detecting sensors for detecting a displacement of said rotor;

magnetic flux distribution detecting means for detecting an N pole magnetic flux distribution which is generated in the gap between said stator and said rotor; and correcting means for adjusting said detected control magnetic flux distribution to equal a N pole magnetic field distribution command.

2. A bearingless rotary machine according to claim 1, wherein said N pole magnetic field distribution command is calculated by a magnetic field command calculator from a position control force command to be imparted to said rotor which derives from said detected displacement of said rotor, and detected M pole magnetic flux distribution.

3. A bearingless rotary machine according to claim 1, wherein said correcting means includes means for determining the polarity of a voltage to be applied to said windings on said stator for generating said N pole control magnetic field, in accordance with a sign of a difference between said N pole magnetic field distribution command and said detected N pole magnetic flux distribution.

4. A bearingless rotary machine according to claim 1, wherein said magnetic flux distribution detecting means comprises windings on said stator, and an integrator for integrating a counter-electromotive voltage induced across said windings on said stator to detect the magnetic flux distribution which is generated in the gap between said stator and said rotor.

5. A bearingless rotary machine according to claim 4, wherein said winding comprises a winding for generating the drive magnetic field or the control magnetic field in the gap between said stator and said rotor.

6. A bearingless rotary machine according to claim 4, wherein said winding comprises k (1, 2, . . . , j, . . . , k) windings equally spaced circumferentially around said stator and angularly displaced at respective positions represented by $(2\pi/k) \times j$, and wherein said N pole magnetic flux distribution is calculated as magnetic flux densities $B\alpha$, $B\beta$ converted to orthogonal two-phase coordinates ($\alpha$, $\beta$), represented by:

$$B\alpha = \frac{2}{k}\sum_{j=1}^{k}\left\{B_j\cos\left(\frac{\pi N j}{k}\right)\right\}$$

$$B\beta = \frac{2}{k}\sum_{j=1}^{k}\left\{B_j\sin\left(\frac{\pi N j}{k}\right)\right\}$$

said magnetic flux densities $B\alpha$, $B\beta$ being applied to calculate said command for the N pole magnetic flux distribution.

7. A bearingless rotary machine according to claim 4, further comprising;
a correcting circuit for compensating for a low-frequency component of the detected N pole magnetic flux distribution with a low-frequency component of a current flowing in said windings on said stator.

8. A bearingless rotary machine according to claim 7, wherein said magnetic flux detecting means comprises an integrator for integrating the counter-electromotive voltage induced across the windings on said stator, said integrator output having a frequency characteristic represented by:

[the magnetic flux distribution detected by the winding]/[the actually generated magnetic flux distribution]=$s/(s+2\pi fc)$, where fc is the cutoff frequency of the integrator, and wherein said correcting circuit compensates for the low-frequency component of the current flowing in the windings on said stator, expressed by:

{$2\pi fc/(s+2\pi fc)$}×[the current in the winding on said stator which generates the magnetic flux distribution], as the low-frequency component of the detected magnetic flux distribution.

9. A bearingless rotary machine according to claim 4, wherein said magnetic flux detecting means comprises:
an integrator for integrating the counter-electromotive voltage induced across the windings on said stator; and
a calculator for realizing a transfer function represented by:

$G(s)=(s+2\pi fc)/(s+2\pi fc')$ where fc is a lower limit frequency for detecting a magnetic flux distribution before being corrected and fc' is a lower limit frequency for detecting a magnetic flux distribution after being corrected, and wherein said transfer function is supplied with an integrated output signal from said integrator and outputs a corrected integrated value in order to correct frequency characteristics of the integrated output signal from said integrator so as to be able to detect the magnetic flux distribution in a low-frequency range.

10. A bearingless rotary machine according to claim 9, wherein said calculator comprises a digital calculator.

11. A bearingless rotary machine according to claim 4, further comprising:
means for rotating said drive magnetic field at a speed higher than a predetermined speed at which detecting frequency characteristics of said magnetic flux detecting means will not be affected, regardless of a rotational speed of said rotor and a generated drive force for the rotor, so that said magnetic flux detecting means will not be affected by the detecting frequency characteristics there of.

12. A bearingless rotary machine according to claim 11, further comprising:
a main shaft;
said rotor comprising a plurality of rotors fixedly mounted on said main shaft;
said stator comprising a plurality of stators for magnetically levitating and supporting said rotors, respectively and applying rotating forces to said rotors, respectively, each of said stators being capable of generating said drive magnetic field and said control magnetic field, respectively; and
a control circuit for controlling said stators, said control circuit having rotating-coordinate-to-fixed-coordinate converters associated with said stators, respectively, and amplitude modulators and frequency modulators for modulating torque-related currents It* and angles $\omega t$ in a rotating coordinate system, to be supplied to said rotating-coordinate-to-fixed-coordinate converters, thereby to individually control an amplitude and a rotational speed of the drive magnetic field acting on each of said rotors.

13. A bearingless rotary machine according to claim 12, further comprising:
means for, if an overall rotational speed of drive magnetic fields on said rotors drops below said rotational speed, generating an M pole drive magnetic field having a rotational speed whose absolute value is greater than said rotational speed, on each of said stators, with the sum of combined frequencies being a frequency corresponding to the overall rotational speed of drive magnetic field on said rotors.

14. A bearingless rotary machine according to claim 13, wherein the generated drive force on each of said rotors has a magnitude corresponding to the frequency of said M pole drive magnetic field, and the sum of the combined drive forces on said rotors serves as an overall generated drive force for the rotors.

* * * * *